US006871236B2

(12) United States Patent
Fishman et al.

(10) Patent No.: US 6,871,236 B2
(45) Date of Patent: Mar. 22, 2005

(54) CACHING TRANSFORMED CONTENT IN A MOBILE GATEWAY

(75) Inventors: Neil Fishman, Bothell, WA (US); Don Kadyk, Bothell, WA (US); Brent Curtis, Seattle, WA (US); Marc Seinfeld, Kenmore, WA (US); Mark Ledsome, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 785 days.

(21) Appl. No.: 09/771,184

(22) Filed: Jan. 26, 2001

(65) Prior Publication Data

US 2002/0103934 A1 Aug. 1, 2002

(51) Int. Cl.[7] .............................................. G06F 15/16
(52) U.S. Cl. ........................ 709/246; 709/213; 709/217; 709/219
(58) Field of Search ................................ 709/246, 203, 709/217–219, 213, 220–221, 227–228; 455/403, 408, 411.2, 426.2, 414.2

(56) References Cited

U.S. PATENT DOCUMENTS 6,119,167 A * 9/2000 Boyle et al. ................ 709/203
6,292,833 B1 * 9/2001 Liao et al. .................. 709/229
6,336,137 B1 * 1/2002 Lee et al. ................... 709/219
6,397,259 B1 * 5/2002 Lincke et al. ............... 709/247
6,414,962 B1 * 7/2002 Hall et al. .................. 370/401
6,430,624 B1 * 8/2002 Jamtgaard et al. .......... 709/246
6,473,609 B1 * 10/2002 Schwartz et al. ........... 455/403
6,636,873 B1 * 10/2003 Carini et al. ................ 707/201

* cited by examiner

Primary Examiner—Hosain Alam
Assistant Examiner—Philip B. Tran
(74) Attorney, Agent, or Firm—Workman Nydegger (57) ABSTRACT

Methods, systems, and computer program products for caching content that has been customized based on one or more operating characteristics of a mobile client. A mobile gateway receives content from a content source and customizes the content using transforms assigned to each mobile client. Transforms account for differences between mobile clients without imposing significant processing burdens on the content server. Copies of the content, the transformed content, and a transform identifier are cached at the mobile gateway so that subsequent requests for the content may be satisfied without requiring access to the content source. Processing that is common among several transforms may be shared. Mobile clients may be any type of computer.

36 Claims, 9 Drawing Sheets

CACHING TRANSFORMED CONTENT IN A MOBILE GATEWAY

BACKGROUND OF THE INVENTION

1. The Field of the Invention

The present invention relates to caching content for mobile clients. More specifically, the present invention relates to methods, systems, and computer program products for caching content that has been customized for one or more operating characteristics of a mobile client.

2. Background and Related Art

In past years, access to electronic content, such as email, Web pages, financial data, sports information, etc., typically has occurred from either a home or office computer. These home and office computers may be classified in two broad categories, laptop computers and desktop computers. The selection between laptop and desktop generally depends on the needs of a particular user. Where some level of portability is desirable, laptop computers are the obvious choice. Otherwise, desktops are the usual selection because laptops ordinarily command a price premium based on their relatively small size when compared to desktops having comparable processing capabilities.

More recently, society in general has been placing an ever-increasing value on mobile access to information. Heightened demand for content, both in business and personal settings, has generated a need for content to be available immediately, from almost anywhere at almost any hour. Therefore, access limited to laptop or desktop computing systems presents a substantial detriment. One of the most significant drawbacks with desktop computers is readily apparent: it is impractical if not impossible to carry a desktop computer around as a user moves from one place to another. Thus, access to content via desktop computer is limited to the location of the desktop computer.

While laptops ease the burden imposed by transporting a computer from one physical location to another, they are only a relatively minor improvement in terms of providing constant access to information. Among other things, (i) the size and bulk of laptop computers preclude a user from carrying a laptop on his or her person; (ii) limited battery life prohibits constant operation; (iii) boot time makes quick content access impractical; and (iv) laptops usually are connected to a specific network, covering a relatively small geographic area. In short, laptops provide a sensible solution for intermittent access to content, but are ill-suited for constant mobile access.

In contrast, truly mobile devices, such as telephones, pagers, personal digital assistants ("PDAs"), and the like, are easily placed in a purse or pocket, operate for many hours by switching to a standby mode when not in use, require no boot time, and use wireless protocols, covering large geographic areas, for communication. Initially, limited processing and display capabilities constrained telephones and pagers to voice or small amounts of text. While PDAs provided more processing and display characteristics, only short-range, infrared, wireless connections were available. However, as the demand for constant mobile access to information has become more pronounced, the once-separate technologies of computers, telephones, pagers, PDAs, etc., are converging. For example, the displays, processing, and memory of telephones and pagers are increasing, and PDAs are supporting telephone- and pager-like communication links.

Nevertheless, the rapidly changing technology of mobile devices presents a number of significant obstacles to providing constant mobile access to information. In particular, the operating characteristics of mobile devices vary greatly. For example, various operating systems, application software, and the like, may represent data differently, support different data fields, and/or support different file types. Differences in hardware impose further barriers in furnishing constant mobile access to information. In spite of the technology convergence mentioned above, telephones typically have the least amount of display area, followed by pagers. PDAs generally have more display, memory, and processor power than either telephones or pagers, but these characteristics vary substantially from one PDA to another.

Even for mobile devices having similar display, memory, and processor capabilities, the assortment of communication links and software that are supported by mobile devices often requires one device to be treated differently from another. As a result, content may need to be tailored or customized for each specific device receiving or requesting content. For example, an email delivered to a telephone may only include textual content based on the display capabilities of the telephone, whereas the same message delivered to a laptop computer may include the textual content and some attached multimedia content. Email software on one telephone may support only certain data fields or file formats for attachments, and may require an underlying data format that is different as compared to other telephones. Similar issues exist for other types of content, such as Web pages, financial data, sports information, meeting reminders, calendars, contacts, mailbox summaries, configuration data, etc., due to the wide variety of operating characteristics found in mobile devices.

While customizing content based on the device that will receive the content is desirable, customization leads to problems of its own. For example, email servers often operate at near capacity. Introducing the additional processing necessary to customize content by device operating characteristics may degrade server performance beyond tolerable limits. Furthermore, implementing the customization at an email server requires changes to the email server for each new type of mobile device that becomes available. Frequent changes to email server code imposes substantial coding and testing responsibilities on developers, due to the already complex nature of email servers. Moreover, already overburdened information systems staff are forced into essentially constant upgrade cycles as developers release new software, especially for rapidly advancing technologies like mobile devices. Other types of content servers suffer from similar considerations.

Caching of customized content may reduce some of the additional processing burdens, but prior art caching techniques may prove inadequate. For example, caching typically involves creating a copy of content that is ordinarily stored elsewhere. The cached copy satisfies requests for the content in less time than would be required to access the usually slower system that is responsible for storing the content. Nevertheless, because the cached copy and the stored copy are identical, caching is transparent to the content requestor. The requestor is aware only of receiving the content that was requested.

Consider then, a mobile device requesting content. Using traditional caching techniques, the mobile device must ask for the customized version of the content because a request for the content itself would require transforming the content before sending it to the mobile device, and repeating the customization for each request is likely to impose significant processing overhead. To realize any significant benefit from caching, the mobile device should request the customized version of the content rather than the content itself.

However, it is undesirable for mobile devices to request customized content for at least two reasons. First, the customized content may not exist. For example, if the content is new and has not been requested previously, the content may not have been added to the cache. Alternatively, the customized content may have been removed from a cache based on comparatively infrequent requests. Whatever the reason, at some point in time it is very likely that the customized content will not be available in the cache, leading to what is known to those of skill in the art as a cache miss. In traditional caching, cache misses are a normal and expected part of cache operation. When a cache miss occurs, the request is redirected to the system responsible for storing the content. In the case of customized content, this requires storing a permanent version of the customized content so that cache misses may be redirected to the permanent version. Obviously, by requiring a permanent version, all content that will be accessible to a mobile device should be customized prior offering access to the mobile device. In other words, a complete copy of the content, customized for the mobile device, should be created to implement traditional caching.

A further problem with mobile devices specifically requesting customized content is that it precludes the customization from being transparent to the mobile devices. Rather than requesting content and allowing the source to determine how the content should be altered for a particular device, the device requests the content that the device believes is best suited for its operating characteristics. As new or enhanced ways of customizing content become available, the mobile device must be configured so that subsequent requests are directed to the new or enhanced content.

SUMMARY OF THE INVENTION

These and other problems are overcome by the present invention, which is directed toward caching content at a mobile gateway that has been customized for one or more operating characteristics of a mobile client. The mobile gateway includes content transforms based on the individual operating characteristics of the various mobile clients that are supported. As used in this application, operating characteristics should be interpreted broadly to encompass any characteristic that is related to providing mobile clients with content from a content source, including communication link, accounting for differences in hardware or software, and the subjective interests of a user at the mobile client. Upon receiving content for a mobile client, the mobile gateway identifies the appropriate transform, transforms the content, and sends the transformed content to the mobile client. Copies of the content, the transformed content, and a transform identifier are cached at the mobile gateway so that subsequent requests for the content may be satisfied without requiring access to the content source. Among other reasons, the mobile gateway cache is unlike other caching techniques because the cache satisfies requests for the content with transformed content that is appropriate for a requesting mobile client, rather than requiring the mobile client to specifically request the transformed content.

The operation of the cache is transparent to the mobile client. Within the mobile gateway, mobile client data identifies the transforms that are associated with particular mobile clients. As requests for content are received from mobile clients, the transform identifier assigned to the mobile client making the request is retrieved from the mobile client data. This identifier, together with the content request, allow the cache to return content that has been customized based on the operating characteristics of the mobile client. If the transformed content for a particular mobile client is not available, the content is retrieved from the cache, transformed, and then the newly transformed content is sent to the mobile client and added to the cache. For cases when the mobile gateway cache does not include the content, the mobile gateway requests the content from the content source.

The mobile gateway is not limited to processing any particular type of content and is not limited to any particular mobile clients or corresponding transforms. For example, the mobile gateway may transform email content, Web content, financial data, sports information, notifications, schedules, contacts, configuration data, etc. Transforms may be based on any relevant operating characteristic of a mobile client, such as processor, memory, display, communication link, application or operating software, etc.

As used in this application, "mobile client" should be interpreted broadly to include virtually any type of computing device, and is not necessarily limited to devices that are easily or conveniently moved. For example, mobile gateways may be cascaded, meaning that one mobile gateway may be a mobile client of another mobile gateway. Telephones, pagers, PDAs, and the like, are merely examples of mobile computing devices and should not be viewed as necessarily limiting the scope of the present invention. One aspect of the invention is the mobile gateway's ability to support new mobile devices as they become available without requiring changes to be made at the content server. As such, it is fully expected that a wide range of mobile devices will become available in the future and should be considered to fall within the meaning of mobile client. Furthermore, specific reference to telephones, pagers, PDAs, and the like, should not be interpreted as excluding support for other types of devices, such as laptops, desktops, etc. The mobile gateway is capable of supporting a wide range of computing devices. Some mobile devices, however, may require more substantial transforms than others.

The mobile gateway does not limit how content is requested and/or received. In some circumstances, a client will request data through the mobile gateway and the transformed content will be delivered to the mobile client as a result of the request. For example, the mobile client may request Web content from the content source. Alternatively, the mobile gateway may transform and deliver content that the mobile client has not explicitly requested. For example, an email notification, change in stock price, or some other event (likely based on criteria set by a user of a mobile client), may trigger the sending of content to the mobile gateway.

The same content may be transformed for more than one mobile client. When content is addressed to multiple mobile clients, the mobile gateway will identifying the appropriate transform for each mobile client, transform the content for each addressed mobile client based on the identified transform, and deliver transformed content to each mobile client. If two different mobile clients share similar operating characteristics, a single transform may be used for both mobile clients.

Using the mobile gateway provides constant mobile access to content for a wide variety of mobile clients. Whether the content is for a business traveler checking for messages, family and friends exchanging personal information, the score or results of a sporting event, changes in financial markets or investments, or some other purpose, the mobile gateway provides mobile clients with continuous access to the content that is of interest to them. In providing this access, no additional processing burdens are placed on the content source. Furthermore, mobile clients are not dependent on the content source to provide customized access based on the particular operating characteristics of each mobile client. Customization need only be implemented at the mobile gateway.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE INVENTION

The present invention extends to methods, systems, and computer program products for caching content that has been customized for one or more operating characteristics of a mobile client. As noted earlier, a mobile client's operating characteristics encompasses any consideration that is relevant to a content source in providing the mobile client with content, including communication link, differences in hardware or software, and the subjective interests of a mobile client user. In other words, anything and everything between a content source and a mobile client, including the source and client themselves, is within the meaning of an operating characteristic.

A mobile gateway receives the content and applies an appropriate transform based on one or more operating characteristics of the mobile clients that will receive the content; both the content and the transformed content are cached at the mobile gateway. A benefit of the mobile gateway cache is that the cache satisfies requests for content with content that has been customized for a mobile client, based on one or more of the mobile client's operating characteristics. Using a mobile gateway allows for support of new mobile clients without requiring modifications to the content server. Furthermore, the added burdens of customizing content for mobile clients are met by the mobile gateway, without imposing significant processing overhead on the content server. Embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media that may be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
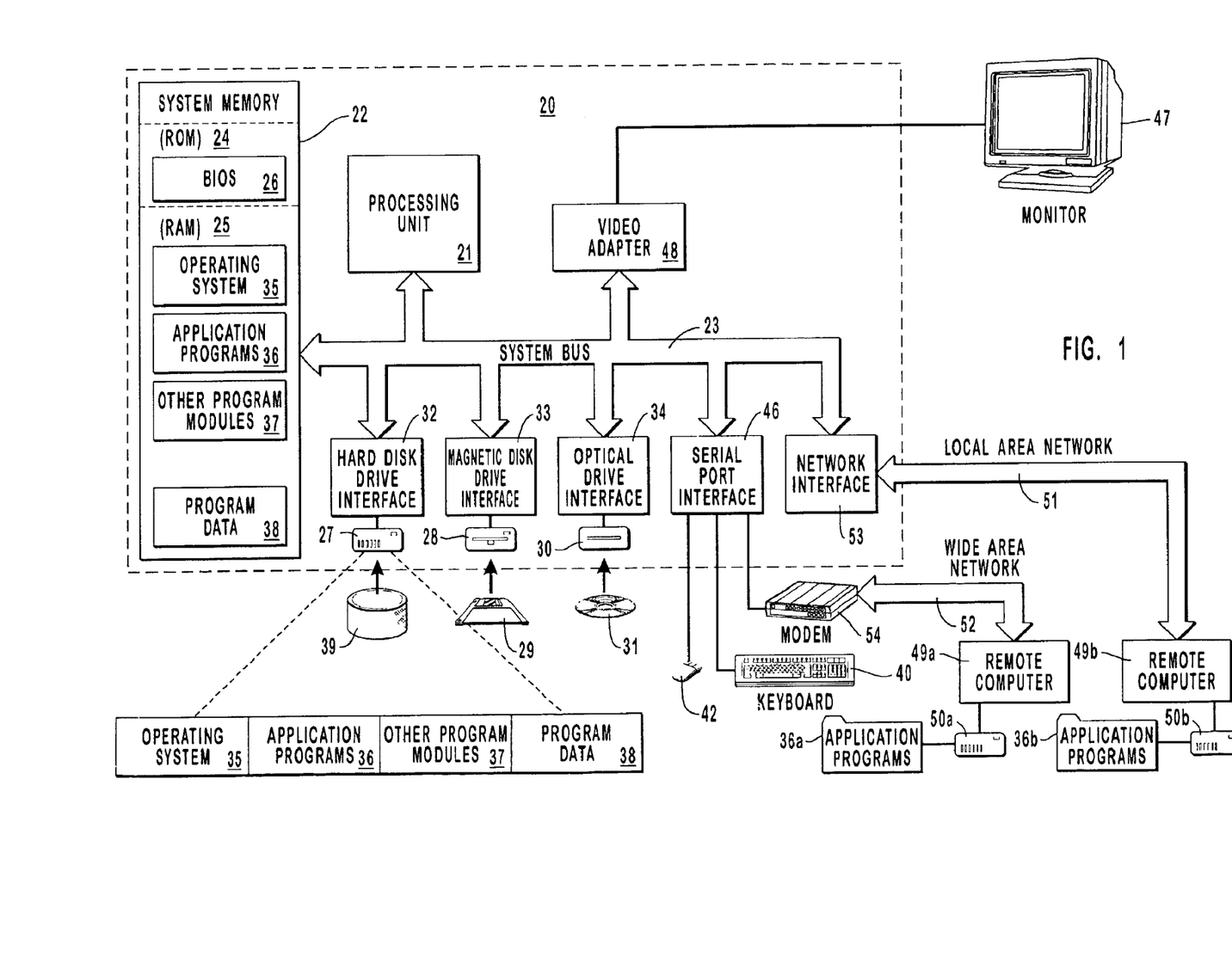
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
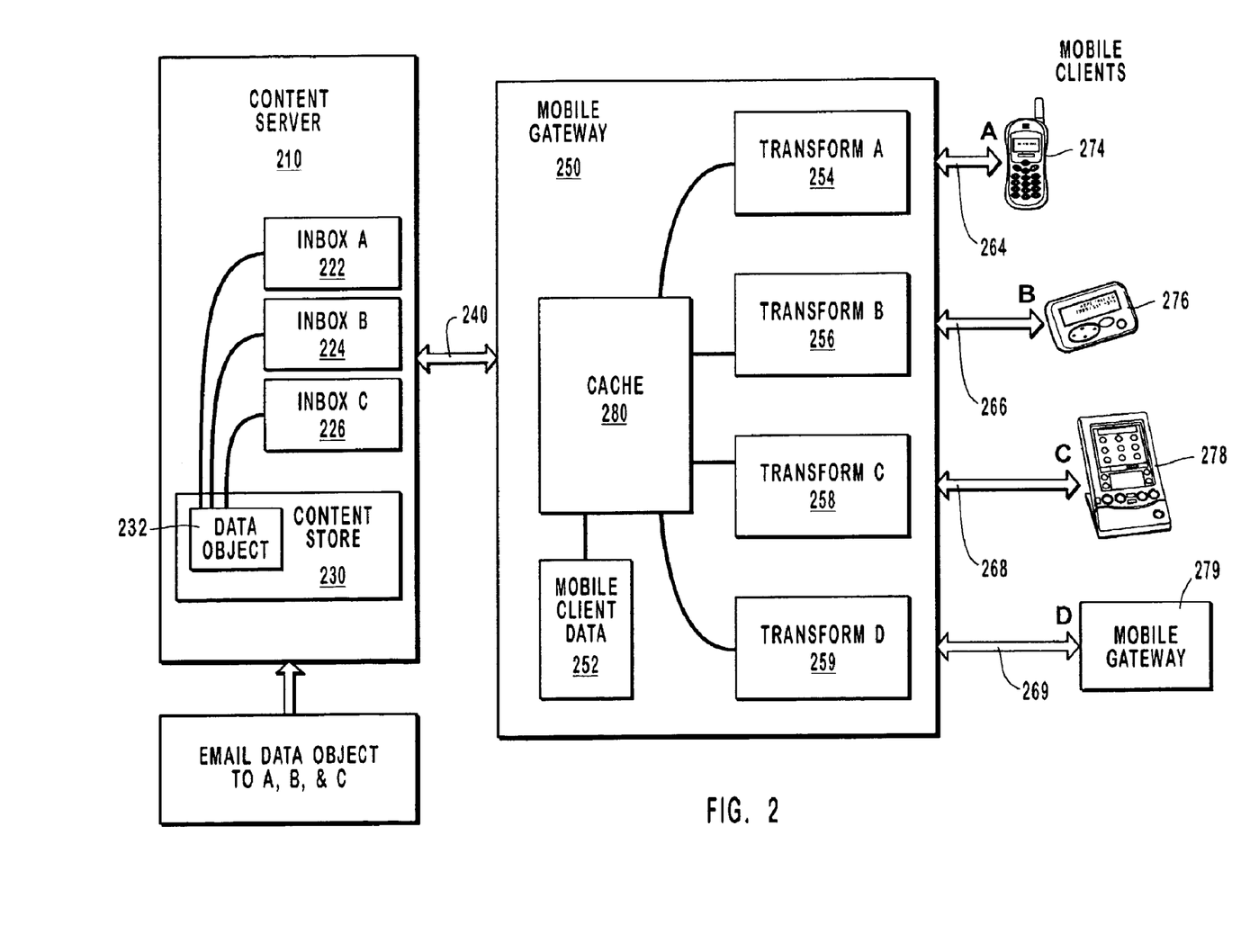
FIG. 2 is a block diagram showing an exemplary mobile gateway that transforms email content for mobile clients.

FIG. 2 shows mobile gateway 250 customizing email content for various mobile clients, such as phone 274, pager 276, PDA 278, and mobile gateway 279. Email content may include various mailbox summaries (e.g., inbox, sent, saved, etc.) and is but one example of the content that may be customized by mobile gateway 250. Other examples include calendar data, daily schedules, contact data, task data, Web content, financial data, sports information, notifications, collaborative documents, discussion groups, etc. Similarly, notifications may represent a wide range of content, including newly available email content, calendar or task reminders, changes in financial data, such as a change in the value of a particular investment, current financial data, such as current market conditions, and current or recent sports information, such as the score or results of a sporting event. Those of skill in the art will further recognize that the specifically enumerated types of content are not mutually exclusive. For example, sports information may be delivered in the form of Web content. As used in this application, therefore, the term "content" should be interpreted broadly to encompass all of the foregoing examples as well as other content. No specific references to particular types of content should be interpreted as necessarily limiting the present invention in any way, absent explicit language to the contrary.

Content server 210 includes content store 230, storing data object 232. Inbox A 222, inbox B 224, and inbox C 226 all refer to data object 232. As shown, only a single copy of data object 232 exists at content server 210. This may occur when a single data object is emailed to multiple recipients. Rather than storing the data object separately for each recipient, content server 210 may store a single copy of the data object, and allow each recipient's inbox to reference the single copy. Alternatively, content server 210 may store a separate copy of the data object for each recipient. The present invention is not limited by how content server 210 chooses to store a particular data object. Each of inbox A 222, inbox B 224, and inbox C 226 is configured to notify recipients when a new email is received, such as the one identified as data object 232. As a result, content server 210 uses communication link 240 to send notifications of the newly received data object 232 to all recipients through mobile gateway 250.

Mobile gateway 250 includes cache 280 and mobile client data 252 for associating the appropriate transforms with each mobile client. Phone 274 is labeled with an "A" to indicate that it corresponds to inbox A 222. Similarly, the label "B" next to pager 276 and the label "C" next to PDA 278 indicate correspondence with inbox B 224 and inbox C 226, respectively. Although no specific inbox is shown for the "D" label of mobile gateway 279, content server 210 may provide email and other content from content store 230 to mobile gateway 279 and the corresponding mobile clients connected to mobile gateway 279. Phone 274, pager 276, PDA 278, and mobile gateway 279, communicate with mobile gateway 250 over communication links 264, 266, 268, and 269, respectively. When mobile gateway 250 receives content for a mobile client, mobile client data 252 identifies the type of mobile client that will receive the content and the transform associated with that mobile client. Mobile client data 252 may be based on data received from mobile clients (such as may be present in the headers of a hypertext transfer protocol or other type of request) or may be based on one or more known operating characteristics of a particular mobile client. For example, transform A 254 is associated with phone 274, transform B 256 is associated with pager 276, transform C 258 is associated with PDA 278, and transform D 259 is associated with mobile gateway 279.

The operation of the mobile gateway cache 280 will be described in greater detail with respect to FIGS. 3A through 3E. Nevertheless, a brief overview follows here. Cache 280 stores content, such as data object 232, and transformed content, such as the content that results from applying transform A 254 to data object 232. When requesting content, mobile clients are not required to specifically request transformed content. Rather, a mobile client simply requests content, such as data object 232. Using mobile client data 252, an identifier for the transform associated with the mobile client may be retrieved. The request for content and the transform identifier are submitted to the cache so that the transformed content may be returned if available. In cases where the content is available in an untransformed state, the appropriate transform is applied to the content. The newly transformed content is then added to the cache and sent to the requesting mobile client. If the content itself is not stored in the cache, mobile gateway 250 first requests the content from content server 210.

The nature of transforms A 254, B 256, C 258, and D 259 depend on the operating characteristics of the corresponding mobile clients. For example, resources such as software, hardware, etc., are likely to vary between phone 274, pager 276, PDA 278, and mobile gateway 279. Software operating characteristics encompass a wide range of differences between the operating systems and applications available at various mobile clients, including differences in character sets, browser versions and extensions, evolving communication protocols, data representations for strings or numbers, supported data fields or file types, mobile client location, and the like. Furthermore, mobile gateways may offer a variety of services to mobile clients. Over time, the services available to any particular mobile client are subject to change. For example, a mobile client may drop an existing service or add a new service. As part of changing some services, mobile clients may need to receive certain control or configuration information. Transforms A 254, B 256, C 258, and D 259 may be used to customize the control or configuration information for individual mobile clients. Likewise, hardware operating characteristics, such as display area, processor speed, available memory, and communication link also are likely to vary from one mobile client to another. For example, phones often have the smallest display area, PDAs the largest, and pagers are somewhere in between. To compensate, transform A 254 of mobile gateway 250 may reduce a received data object to the minimal amount of display area possible. In an email notification context, perhaps transform A 254 limits the subject line to characters or less.

Those of skill in the art will recognize that one aspect of transform A 254, transform B 256, transform C 258, and transform D 259, is to consider the communication links, 264, 266, 268, and 269, between mobile gateway 250 and mobile clients 274, 276, 278, and 279. As such, mobile gateway 250 may implement a wide variety of communication protocols, including wireless protocols to facilitate the mobility of the mobile clients and wireline connection protocols. The wireless transport protocol ("WTP") is an example of a protocol commonly used in wireless communication and HTTP is an example of a protocol commonly used in wireline connections. Furthermore, communication links 264, 266, 268, 269, and 240 may comprise one or more communication protocols in combination with one another.

Although not shown, each transform may include a number of sub-transforms. For example, the implementation of a particular communication protocol or encryption technology may occur in a sub-transform. Where two or more mobile clients share the same communication protocol, type of communication link, or encryption technology, the corresponding transforms for those mobile clients may share the sub-transform that implements the communication protocol, type of communication link, encryption technology, etc.

Likewise, those of skill in the art will recognize that similar mobile clients may be connected to mobile gateway 250 over distinct communication links. As described above, the transforms for these similar mobile clients may be identical except for separate sub-transforms implementing the communication link. The distinction between sub-transform and transform is semantic only and described in this fashion only to indicate that transforms may share processing where appropriate. Thus, any differentiation between sub-transform and transform is completely arbitrary. A transform may comprise one or more sub-transforms. Alternatively, a transform may be a combination of several transforms and/or sub-transforms. As such, the term "transform" should be interpreted broadly to include any number of transforms and/or sub-transforms, singly or in combination, that may or may not be included within other transforms, either in whole or in part.

As suggested above, certain transforms will be directed specifically toward customizing content. For example, data object 232 may include text, graphics, markup, and multimedia content. Pager 276 and phone 274 may not include an MPEG decoder for viewing the multimedia content or may not include sufficient memory, processor capability, and display area for showing graphics. Pager 276 may support only plain text. Communication link 264 for phone 274 may be ill-suited for transferring large files, whereas communication link 266 for pager 276 and communication link 268 for PDA 278 may provide a greater bandwidth and packet size, allowing large files to be transferred without significant concern. The display area for phone 274 may provide for a relatively small number of characters when compared to the display area of PDA 278. Transforms A 254, B 256, C 258, and D 259 consider one or more of these operating characteristics and customize data object 232 accordingly. Although phone 274, pager 276, PDA 278, and mobile gateway 279 all may request the same data object 232, each may receive a transformed data object that differs from the transformed data object received by the others.

By placing transforms A 254, B 256, C 258, and D 259 in mobile gateway 250, content server 210 is not required to implement any of the communication protocols used in communication links 264, 266, 268, and 269. Content server 210 need only support a single communication protocol for exchanging content with mobile gateway 250 over communication link 240. As a result, content server 210 is not burdened with supporting the large number of communication protocols that may be needed for communicating with mobile clients. Furthermore, new communication links may be implemented and old communication links may be upgraded at mobile gateway 250 without significantly impacting the operation of content server 210.

Mobile gateway 279 shows that a mobile gateway is another type of mobile client. Cascading mobile gateways in this manner provides additional flexibility in a given implementation for providing customized content to mobile clients. Like transforms A 254, B 256, and C 258, transform D 259 customizes content for mobile gateway 279. For example, transform D 259 may provide the data fields and representations that are supported by mobile gateway 279, compress the content, and implement the protocol used over communication link 269. Mobile gateway 279 operates like mobile gateway 250, and includes transforms and a cache for the mobile clients it serves. For example, the transforms of mobile gateway 279 may implement the protocols for communicating with the mobile clients of mobile gateway 279, and may implement encryption to ensure secure communication.

Using communication link 240, mobile gateway 250 may be configured to receive data object 232 along with a list of one or more intended recipients. Mobile gateway 250 examines mobile client data 252 to identify the mobile clients contained in the list, such as phone 274, pager 276, PDA 278, and mobile gateway 279. In identifying the mobile clients contained in the list, mobile gateway 250 also identifies the corresponding transform to be used in customizing data object 232 based on one or more operating characteristics of the mobile clients that will be sent data object 232. Transform A 254 corresponds to phone 274, transform B 256 corresponds to pager 276, transform C 258 corresponds to PDA 278, and transform D 259 corresponds to mobile gateway 279.

Mobile gateway 250 also may request content from content server 210 on the behalf of mobile clients. In the email context currently being described, after mobile client 274 receives a customized notification that data object 232 is available, mobile client 274 may request retrieval of data object 232 through mobile gateway 250. After retrieving data object 232 from content server 210, mobile gateway 250 will customize data object 232 for one or more operating characteristics of mobile client 274 using transform A 254.

Note that content server 210 simply provides content in the usual manner, without any regard for the operating characteristics of any mobile clients. Mobile gateway 250 shields content server 210 from having to know the operating characteristics of the mobile clients. However, this does not mean that content server 210 is completely ignorant regarding mobile clients 274, 276, 278, and 279. For example, content server 210 may include rules for determining the type of content that should be sent to mobile gateway 250. Based on these rules, perhaps on a client-by-client basis, content server 210 may determine not to send a large multimedia file to mobile client 274. Nevertheless, any processing performed by content server 210 that may be specific to mobile clients, usually is minor in comparison to the processing performed in customizing content based on the operating characteristics of mobile clients, as exemplified by transform A 254, transform B 256, transform C 258, and transform D 259.

FIGS. 3A through 3E are block diagrams illustrating the flow of content in an exemplary computerized system in accordance with the present invention and will be used to describe the operation of the mobile gateway cache in further detail. Content server 310 includes content store 330, storing data object 332. When references to data object 332 are added to Inbox A 322 and inbox B 324, content server 310 sends notifications to mobile gateway 350 over communication link 340. As indicated above, a single notification may be sent to a list of mobile clients, such as phone 374 and pager 376, using mobile gateway 350. Upon receiving the list and notification, mobile gateway 350 uses mobile client data 352 to identify phone 374 and pager 376 as recipients.

Figure 3A:
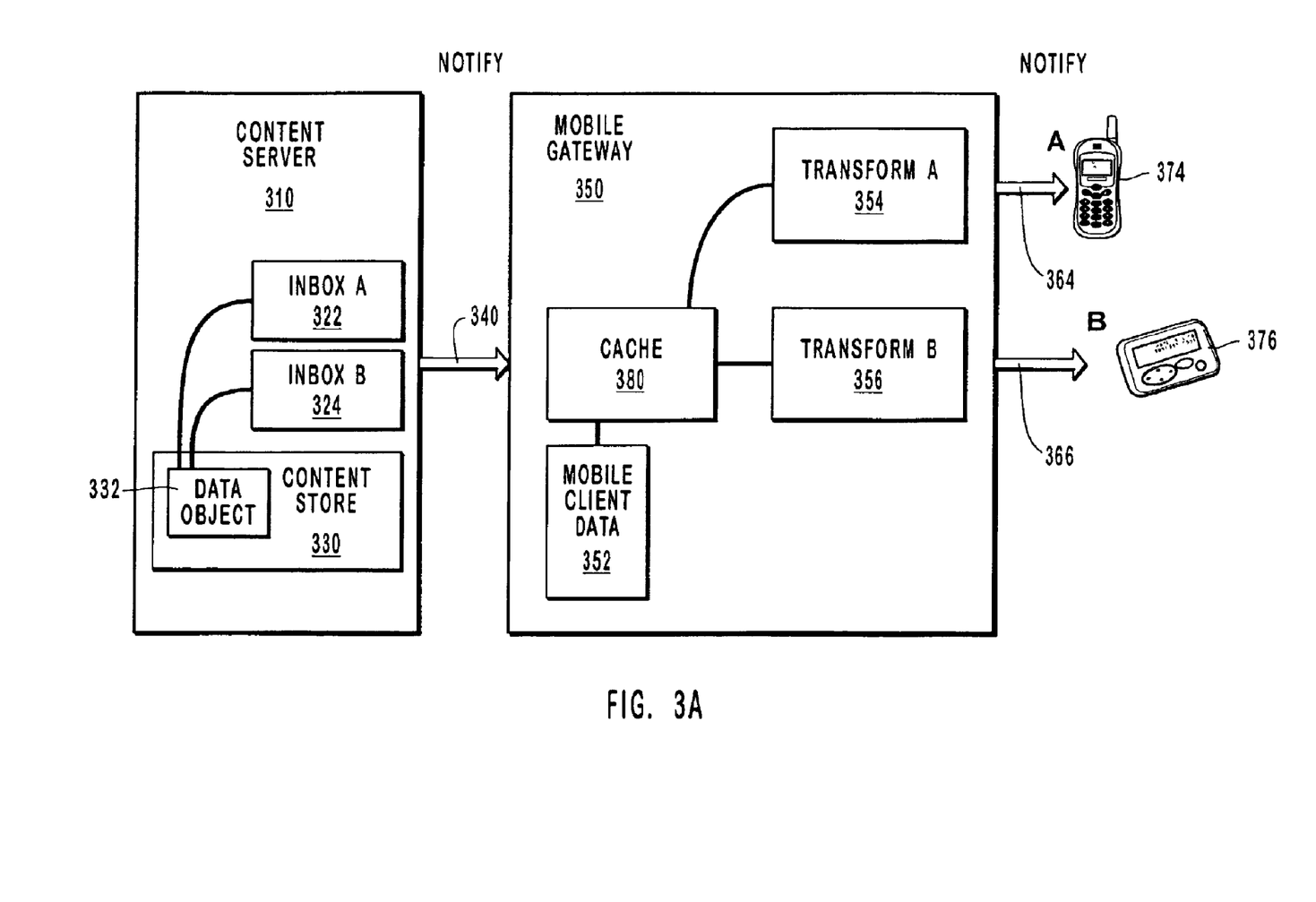
FIGS. 3A through 3E are block diagrams illustrating the flow of content in an exemplary computerized system in accordance with the present invention.

Mobile client data 352 also identifies transform A 354 and transform B 356 as the appropriate transforms for phone 374 over communication link 364 and pager 376 over communication link 366. The notification and the transformed notification, as customized for phone 374, are added to cache 380 and the transformed notification is sent to phone 374. If pager 376 also uses transform A 354, the transformed notification in the cache may be sent to pager 376. Otherwise the notification is separately customized for pager 376 by applying transform B 356.

Figure 3B:
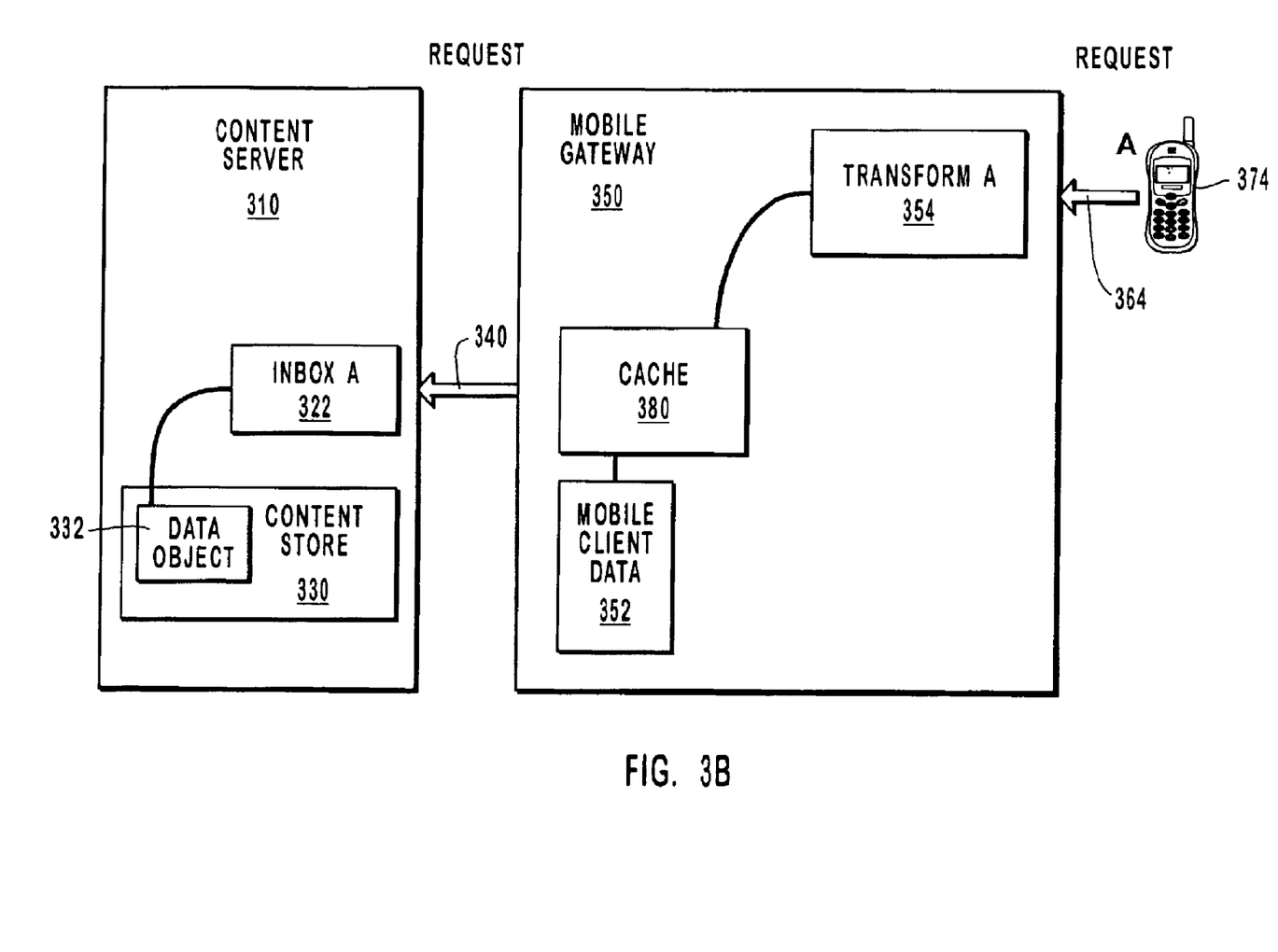

Turning next to FIG. 3B, phone 374 requests the content associated with the notification from mobile gateway 350. For example, the notification may include a uniform resource locator ("URL") or some other identifier for data object 332 at content server 310. Selecting the URL causes phone 374 to make the request. Mobile gateway 350 uses mobile client data 352 to identify the transform associated with phone 374. With the URL and associated transform, cache 380 is examined to see if the requested content is available. The cache is unable to satisfy the request because neither the transformed content nor the content itself is stored. Therefore, using communication link 340, mobile gateway requests data object 332 from content server 310.

Currently, one of the most common uses of URLs is in connection with the hypertext transfer protocol ("HTTP"). A URL includes a protocol, a server or host name, and an identifier for the content being requested. However, the present invention is not necessarily limited to any particular type of content identifier. In a more general sense, content may be identified by a uniform resource identifier ("URI"). As used in this application, the term uniform resource identifier or URI should be interpreted broadly as a generic scheme for uniquely identifying content and other resources. Reference to a particular type of uniform resource identifier, such as a URL, should not be interpreted as necessarily limiting the scope of the present invention.

Figure 3C:
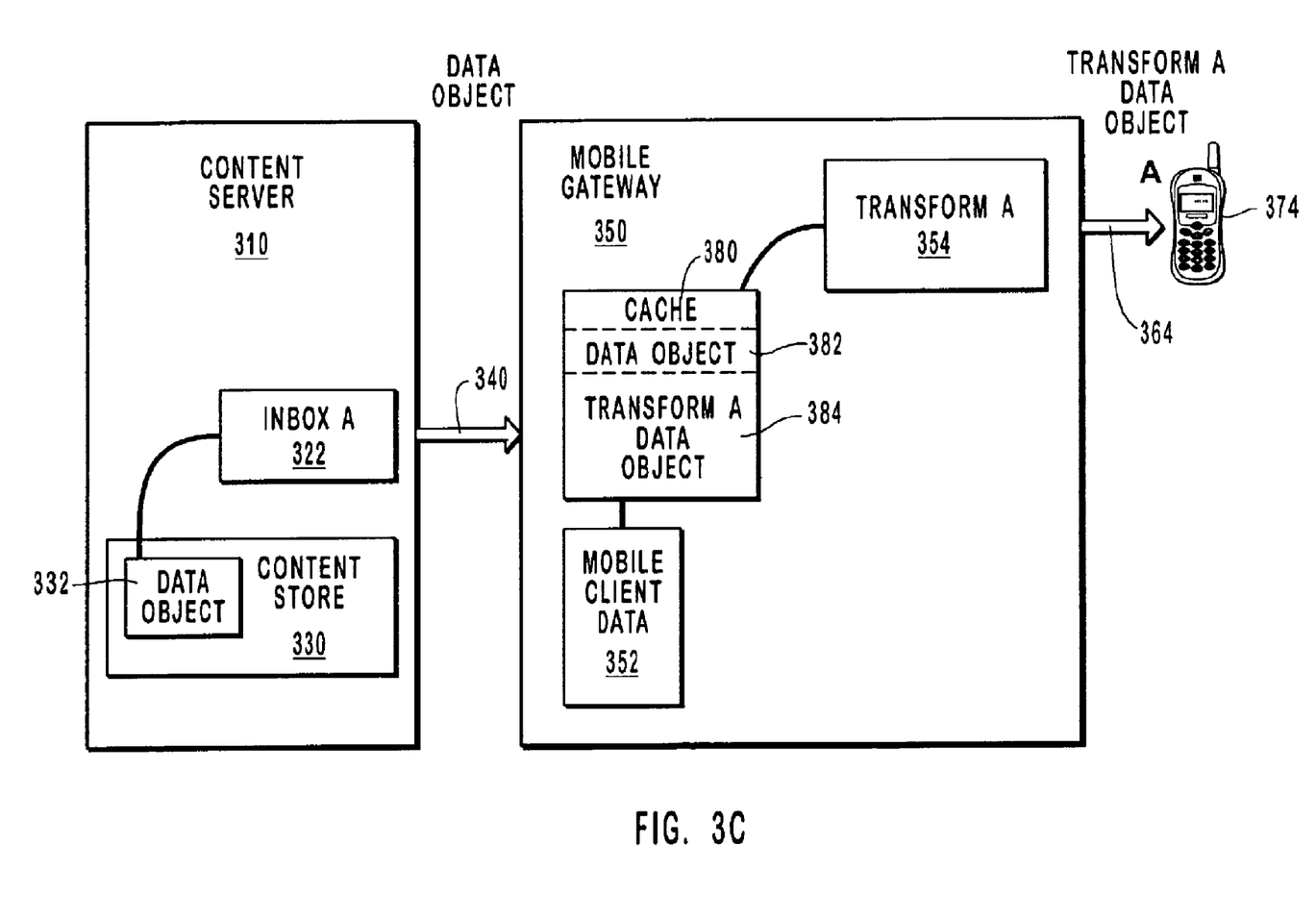

As shown in FIG. 3C, content server 310 responds by sending data object 332 to mobile gateway 350 via communication link 340. The copy of data object 332 stored in cache 380 is referenced as data object 382. Mobile gateway 350 applies transform A 354 to data object 382 and sends the transformed content to phone 374 using communication link 364. The transformed data object is stored in cache 380 as transform A data object 384.

Figure 3D:
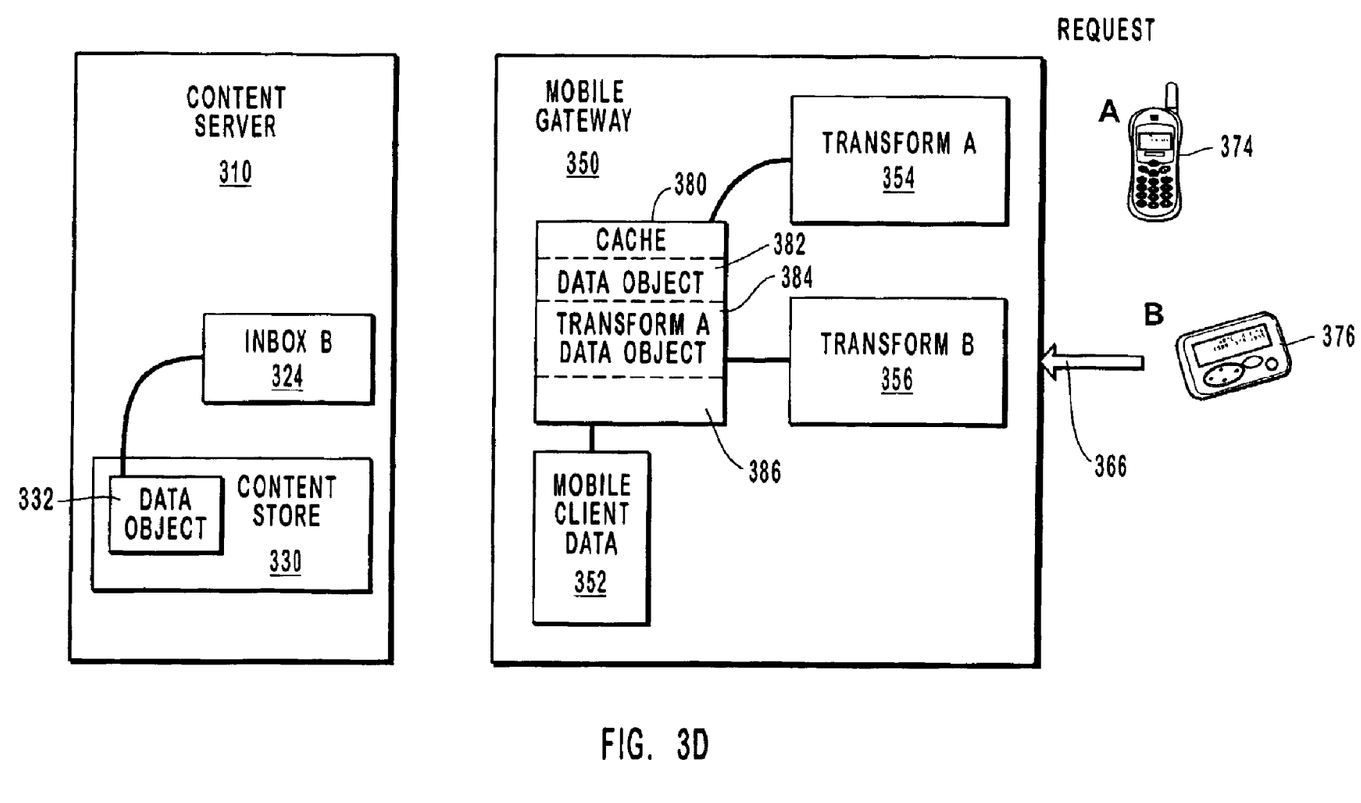

Moving now to FIG. 3D, pager 376 also requests the content associated with the notification. As with the request from phone 374, mobile gateway 350 uses mobile client data 352 to identify the transform B 356 associated with pager 376. Using the URL from the notification and identified transform, cache 380 is examined to see if the requested content is available. The cache is unable to satisfy the request even though data object 382 and transform A data object 384 are stored in the cache. As indicated by reference 386, a version of data object 386 customized by transform B 356 for pager 376 does not exist.

Figure 3E:
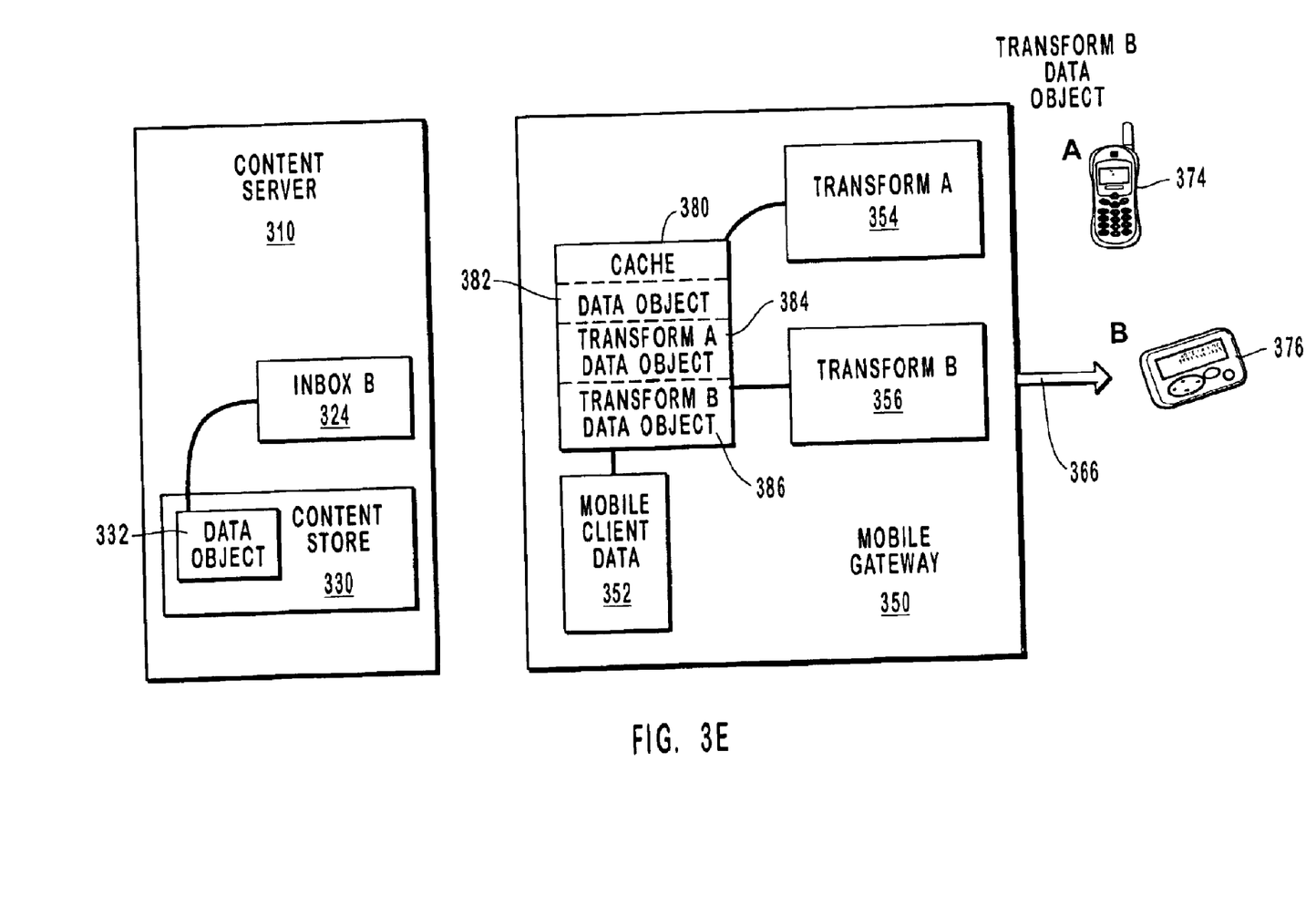

With reference now to FIG. 3E, rather than having to request data object 332 from content server 310, mobile gateway 310 applies transform B 356 to data object 382. The result, transform B data object 386 is placed in cache 380 and sent to pager 376 over communication link 366. From this point on, requests for data object 332 that have been customized by transform A 354 or transform B 356 may be satisfied from cache 380. Phone 374, pager 376, or any other mobile client that uses either transform A 354 or transform B 356 may generate these requests. Note, however, that mobile clients request the content itself, data object 332, rather than the corresponding transformed versions of the content. Furthermore, as mobile clients, using other transforms, request data object 332, the corresponding transformed content is added cache 380. The present invention does not impose any particular limit on the number of transforms that may be applied to data object 382 or on the number of transformed data objects stored in cache 380.

Figure 4A:
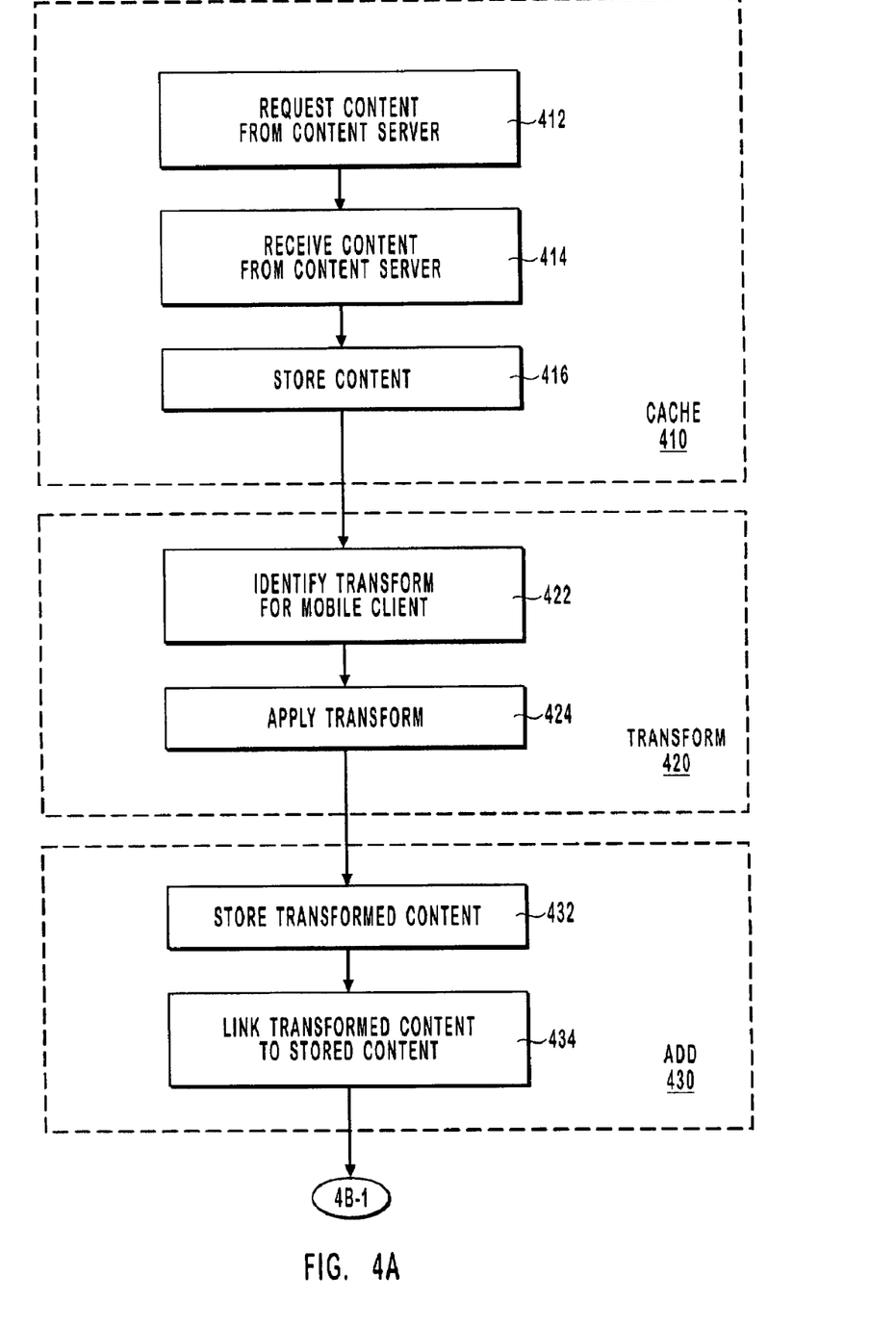
FIGS. 4A and 4B depict an exemplary method for caching content that has been customized for one or more operating characteristics of a mobile client.
Figure 4B:
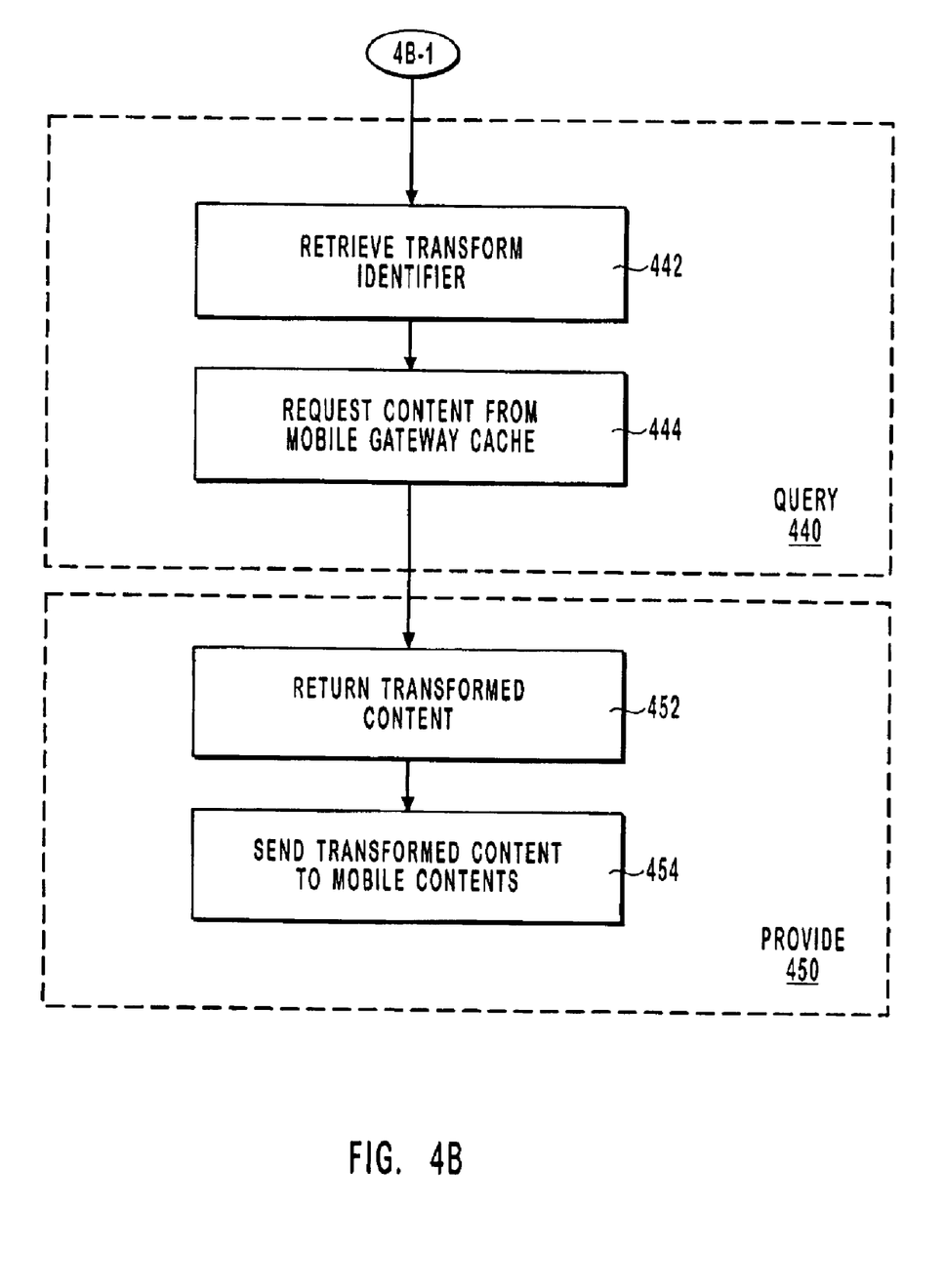

FIGS. 4A and 4B depict an exemplary method for caching content that has been customized based on one or more operating characteristics of a mobile client. The step for caching content (410) may include the acts of requesting content (412) from the content server, receiving (414) the requested content, and storing (416) the content in the cache. Requests for content may occur when a notification that was received by a mobile client is selected. However, the present invention does not require that a mobile gateway request the content that is placed in the cache. For example, notifications and their corresponding transforms may be stored in the cache in accordance with practicing the present invention. As noted above, the content may be addressed to one or more mobile clients.

The step for transforming (420) the content may include the acts of identifying (422) the associated transform for a mobile client and applying (424) the transform to the content. Mobile client data may be used to associate the appropriate transforms with particular mobile clients. The acts of storing (432) transformed content in the cache and linking (434) the transformed content to the stored content may be included in a step for adding transformed content (430) to the cache. Linking may be accomplished by including a transform identifier with the transformed content.

Referring next to FIG. 4B, a step for querying (440) the mobile gateway cache may include the acts of retrieving (442) the transform identifier from the mobile client data and requesting (444) the content from the cache. The transform identifier is included with the request so that the cache returns the appropriate transformed content. A step for providing (450) the transformed content may include an act of the cache returning (452) the transformed content and an act of sending (454) the transformed content to one or more mobile client.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In an computerized system that includes a content server, a mobile gateway, and one or more mobile clients, wherein the mobile gateway transforms content received from the content server based on one or more operating characteristics of at least one mobile client, and wherein the at least one mobile client is unaware of the specific transform applied to the content, a method of obtaining transformed content from the mobile gateway so that the transformed content may be sent to the at least one mobile client, the method comprising the acts of:

receiving content at a mobile gateway;

applying a first transform to the content, thereby creating a first transformed content, the first transform specifically considering one or more operating characteristics of at least one mobile client;

storing the first transformed content in a mobile gateway cache;

requesting the content from the mobile gateway cache, wherein the request includes a first transform identifier; and in response to the request for content, returning the first transformed content.

2. A method as recited in claim 1 wherein the mobile gateway includes mobile client data associating the first transform with the at least one mobile client, the method further comprising the acts of:

receiving a request for the content from the at least one mobile client;

retrieving the first transform identifier from the mobile client data; and sending the first transformed content to the at least one mobile client.

3. A method as recited in claim 1 further comprising the act of receiving from the content source, content addressed to two or more mobile clients, wherein the acts of (i) receiving content at a mobile gateway, (ii) applying a first transform to the content, and (iii) storing the first transformed content in a mobile gateway cache, are performed in connection with obtaining transformed content for a first of the two or more mobile clients, and wherein the acts of (iv) requesting the content from the mobile gateway cache, and (v) returning the first transformed content in response to the request for content, are performed in connection with obtaining transformed content for a second of the two or more mobile clients.

4. A method as recited in claim 3 further comprising the act of sending the first transformed content to the two or more mobile clients.

5. A method as recited in claim 3 wherein the content comprises a notification.

6. A method as recited in claim 1 wherein the content is identified by a uniform resource identifier.

7. A method as recited in claim 6 wherein the uniform resource identifier comprises a uniform resource locator.

8. A method as recited in claim 1 further comprising the act of storing the content in the mobile gateway cache.

9. A method as recited in claim 1 further comprising the acts of:

applying a second transform to the content, thereby creating a second transformed content, the second transform specifically considering one or more operating characteristics of a second mobile client;

storing the second transformed content in the mobile gateway cache;

requesting the content from the mobile gateway cache, wherein the request includes a second transform identifier; and in response to the request for content, returning the second transformed content.

10. A method as recited in claim 1 wherein the content comprises a first portion of other content, the other content including the first portion and a second portion, the method further comprising the acts of:

requesting the other content from the mobile gateway cache; and in response to the request for the other content, returning the first transformed content.

11. A method as recited in claim 10 further comprising the acts of:
   requesting the second portion of the other content from the content source;
   storing the second portion of the other content in the mobile gateway cache;
   applying a transform to the second portion of the other content, thereby creating a second portion transformed content, the transform specifically considering one or more operating characteristics of one or more mobile clients;
   storing the second portion transformed content in the mobile gateway cache; and
   in response to the request for the other content, returning the second portion transformed content.

12. In an computerized system that includes a content server, a mobile gateway, and one or more mobile clients, wherein the mobile gateway transforms content received from the content server based on one or more operating characteristics of at least one mobile client, and wherein the at least one mobile client is unaware of the specific transform applied to the content, a method of obtaining transformed content from the mobile gateway so that the transformed content may be sent to the at least one mobile client, the method comprising steps for:
   caching content in a mobile gateway cache;
   transforming the content according to a first transform, thereby creating a first transformed content, wherein the first transform is based on one or more operating characteristics of at least one mobile client;
   adding the first transformed content to the mobile gateway cache;
   querying the mobile gateway cache for the content, the query including a first transform identifier; and
   in response to the query for content, providing the first transformed content.

13. A method as recited in claim 12 wherein the step for providing the first transformed content comprises the acts of:
   receiving a request for the content from the at least one mobile client; and
   sending the first transformed content to the at least one mobile client.

14. A method as recited in claim 13 wherein the mobile gateway includes mobile client data associating the first transform with the at least one mobile client, and wherein the step for querying the mobile gateway comprises the act of retrieving the first transform identifier from the mobile client data.

15. A method as recited in claim 12 wherein the step for caching content comprises the act of receiving from the content source, content that is addressed to two or more mobile clients.

16. A method as recited in claim 15 wherein the steps for (i) caching content in a mobile gateway cache, (ii) transforming the content, and (iii) adding the first transformed content to the mobile gateway cache, are performed in connection with obtaining transformed content for a first of the two or more mobile clients, and wherein the steps for (iv) querying the mobile gateway cache, and (v) providing the first transformed content in response to the query for content, are performed in connection with obtaining transformed content for a second of the two or more mobile clients.

17. A method as recited in claim 16 wherein the step for providing the first transformed content comprises the act of sending the first transformed content to the two or more mobile clients.

18. A method as recited in claim 16 wherein the content comprises a notification.

19. A method as recited in claim 12 wherein the content is identified by a uniform resource identifier.

20. A method as recited in claim 19 wherein the uniform resource identifier comprises a uniform resource locator.

21. A method as recited in claim 12 further comprising steps for:
   transforming the content according to a second transform, thereby creating a second transformed content, wherein the second transform is based on one or more operating characteristics of a second mobile client;
   adding the second transformed content to the mobile gateway cache;
   querying the mobile gateway cache for the content, the query including a second transform identifier; and
   in response to the query for content, providing the second transformed content.

22. A method as recited in claim 12 wherein the content comprises a first portion of other content, the other content including the first portion and a second portion, the method further comprising steps for:
   querying the mobile gateway cache for the other content; and
   in response to the query for the other content, providing the first transformed content.

23. A method as recited in claim 22 further comprising steps for:
   caching the second portion of the other content in a mobile gateway cache;
   transforming the second portion of the other content according to a transform, thereby creating a second portion transformed content, wherein the transform is based on one or more operating characteristics of at least one mobile client;
   adding the second portion transformed content and a transform identifier to the mobile gateway cache; and
   in response to the query for other content, providing the second portion transformed content.

24. In an computerized system that includes a content server, a mobile gateway, and one or more mobile clients, wherein the mobile gateway transforms content received from the content server based on one or more operating characteristics of at least one mobile client, and wherein the at least one mobile client is unaware of the specific transform applied to the content, a method of storing transformed content at the mobile gateway so that the transformed content may be sent to the at least one mobile client, the method comprising the acts of:
   receiving content at a mobile gateway;
   applying a first transform to the content, thereby creating a first transformed content, the first transform specifically considering one or more operating characteristics of at least one mobile client;
   storing the first transformed content at the mobile gateway, wherein the first transformed content is identified by a first transform identifier; and
   associating, at the mobile gateway, the first transform identifier with one or more client so that when the mobile gateway receives a request to send the content to the one or more clients, the mobile gateway can identify and send the first transformed content in response to the request.

25. A method as recited in claim 24 wherein the content comprises a notification.

26. A method as recited in claim 24 wherein the content is identified by a uniform resource identifier.

27. A computer program product comprised of one or more computer readable media with machine-executable instructions for performing the acts of the method recited in claim 24.

28. A method as recited in claim 24 further comprising the acts of:
applying a second transform to the content, thereby creating a second transformed content, the second transform specifically considering one or more operating characteristics of a second mobile client; and
storing the second transformed content at the mobile gateway.

29. In an computerized system that includes a content server, a mobile gateway, and one or more mobile clients, wherein the mobile gateway transforms content received from the content server based on one or more operating characteristics of at least one mobile client, and wherein the at least one mobile client is unaware of the specific transform applied to the content, a computer program product for implementing a method of obtaining transformed content from the mobile gateway so that the transformed content may be sent to the at least one mobile client, comprising:
a computer readable medium for carrying machine-executable instructions for implementing the method at a mobile gateway; and
wherein said method is comprised of machine-executable instructions for performing the acts of:
receiving content at a mobile gateway;
applying a first transform to the content, thereby creating a first transformed content, the first transform specifically considering one or more operating characteristics of at least one mobile client;
storing the first transformed content in a mobile gateway cache;
requesting the content from the mobile gateway cache, wherein the request includes a first transform identifier; and
in response to the request for content, returning the first transformed content.

30. A computer program product as recited in claim 29 wherein the method is comprised further of machine-executable instructions for performing the act of storing the content in the mobile gateway cache.

31. A computer program product as recited in claim 29 wherein the mobile gateway includes mobile client data associating the first transform with the at least one mobile client, the method comprised further of machine-executable instructions for performing the acts of:
receiving a request for the content from the at least one mobile client;
retrieving the first transform identifier from the mobile client data; and
sending the first transformed content to the at least one mobile client.

32. A computer program product as recited in claim 29 wherein the method is comprised further of machine-executable instructions for performing the act of receiving from the content source, content addressed to two or more mobile clients, wherein the acts of (i) receiving content at a mobile gateway, (ii) applying a first transform to the content, and (iii) storing the first transformed content in a mobile gateway cache, are performed in connection with obtaining transformed content for a first of the two or more mobile clients, and wherein the acts of (iv) requesting the content from the mobile gateway cache, and (v) returning the first transformed content in response to the request for content, are performed in connection with obtaining transformed content for a second of the two or more mobile clients.

33. A computer program product as recited in claim 32 wherein the method is comprised further of machine-executable instructions for performing the act of sending the first transformed content to the two or more mobile clients.

34. A computer program product as recited in claim 29 wherein the method is comprised further of machine-executable instructions for performing the acts of:
applying a second transform to the content, thereby creating a second transformed content, the second transform specifically considering one or more operating characteristics of a second mobile client;
storing the second transformed content in the mobile gateway cache;
requesting the content from the mobile gateway cache, wherein the request includes a second transform identifier; and
in response to the request for content, returning the second transformed content.

35. A computer program product as recited in claim 29 wherein the content comprises a first portion of other content, the other content including the first portion and a second portion, the method comprised further of machine-executable instructions for performing the acts of:
requesting the other content from the mobile gateway cache; and
in response to the request for the other content, returning the first transformed content.

36. A computer program product as recited in claim 35 wherein the method is comprised further of machine-executable instructions for performing the acts of:
requesting the second portion of the other content from the content source;
storing the second portion of the other content in the mobile gateway cache;
applying a transform to the second portion of the other content, thereby creating a second portion transformed content, the transform specifically considering one or more operating characteristics of one or more mobile clients;
storing the second portion transformed content in the mobile gateway cache; and
in response to the request for the other content, returning the second portion transformed content.

* * * * *